(12) United States Patent
McGarvey et al.

(10) Patent No.: US 7,153,039 B2
(45) Date of Patent: Dec. 26, 2006

(54) CONNECTION OF OPTICAL WAVEGUIDES TO OPTICAL DEVICES

(75) Inventors: Brian McGarvey, County Cork (IE); Thomas Moriarty, Cork (IE)

(73) Assignee: Firecomms Limited, Cork (IE)

( * ) Notice: Subject to any disclaimer, the term of this patent is extended or adjusted under 35 U.S.C. 154(b) by 33 days.

(21) Appl. No.: 11/109,674

(22) Filed: Apr. 20, 2005

(65) Prior Publication Data

US 2005/0191012 A1   Sep. 1, 2005

Related U.S. Application Data

(63) Continuation of application No. PCT/IE03/000144, filed on Oct. 21, 2003.

(30) Foreign Application Priority Data

Oct. 22, 2002   (IE) ................................ 2002/0826

(51) Int. Cl.
G02B 6/36   (2006.01)
(52) U.S. Cl. ........................................................ 385/91
(58) Field of Classification Search ................ 385/88, 385/90–92
See application file for complete search history.

(56) References Cited

U.S. PATENT DOCUMENTS

| | | | |
|---|---|---|---|
| 4,362,360 A * | 12/1982 | Mannschke ................. | 385/88 |
| 5,631,989 A | 5/1997 | Koren et al. ................. | 385/91 |
| 5,896,481 A | 4/1999 | Beranek et al. .............. | 385/90 |
| 6,101,307 A * | 8/2000 | Heimuller et al. .......... | 385/139 |
| 6,113,284 A | 9/2000 | Wu et al. ..................... | 385/92 |
| 6,170,996 B1 | 1/2001 | Miura et al. ................. | 385/94 |
| 6,234,686 B1 * | 5/2001 | Tonai et al. .................. | 385/88 |
| 6,312,624 B1 | 11/2001 | Kropp ........................ | 264/1.25 |
| 6,422,765 B1 * | 7/2002 | Goldner et al. ............. | 385/92 |
| 6,942,396 B1 * | 9/2005 | Marion et al. ............... | 385/90 |
| 2002/0028049 A1 | 3/2002 | Bartur ......................... | 385/92 |

FOREIGN PATENT DOCUMENTS

| | | |
|---|---|---|
| DE | 19817719 | 10/1999 |
| EP | 0938005 | 8/1999 |
| EP | 0987769 | 3/2000 |
| JP | 58-172610 | 10/1983 |
| JP | 10-282369 | 10/1998 |

OTHER PUBLICATIONS

Patent Abstracts of Japan, vol. 8, No. 10, Jan. 18, 1984 & JP 58172610A (Tateishi Denki KK), Oct. 11, 1983, abstract.
Patent Abstracts of Japan, vol. 1999, No. 1, Jan. 29, 1999 & JP 10282369A (Hitachi Ltd), Oct. 23, 1998, abstract.

* cited by examiner

Primary Examiner—Akm Enayet Ullah
Assistant Examiner—Daniel Petkovsek
(74) Attorney, Agent, or Firm—Jacobson Holman PLLC

(57) ABSTRACT

An optical assembly has a socket for receiving a fiber termination ferrule. A PIN diode is on a lead frame encapsulated in a transparent body. As a fiber ferrule is pushed into the socket the electronic output from the diode is monitored to determine optimum insertion distance.

19 Claims, 6 Drawing Sheets

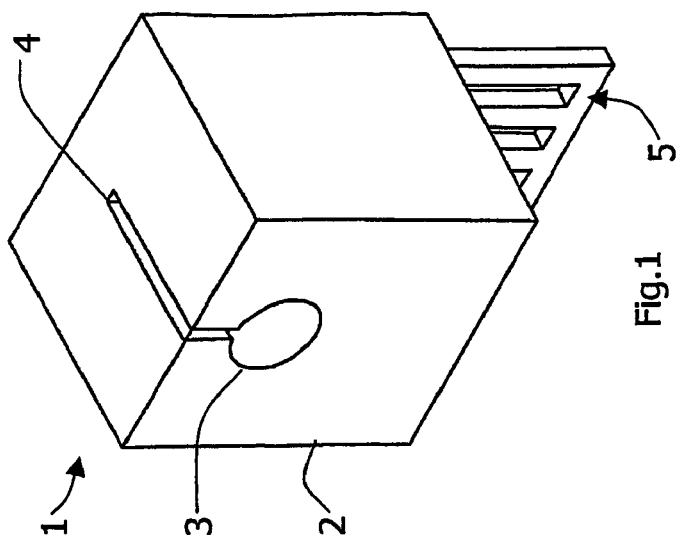
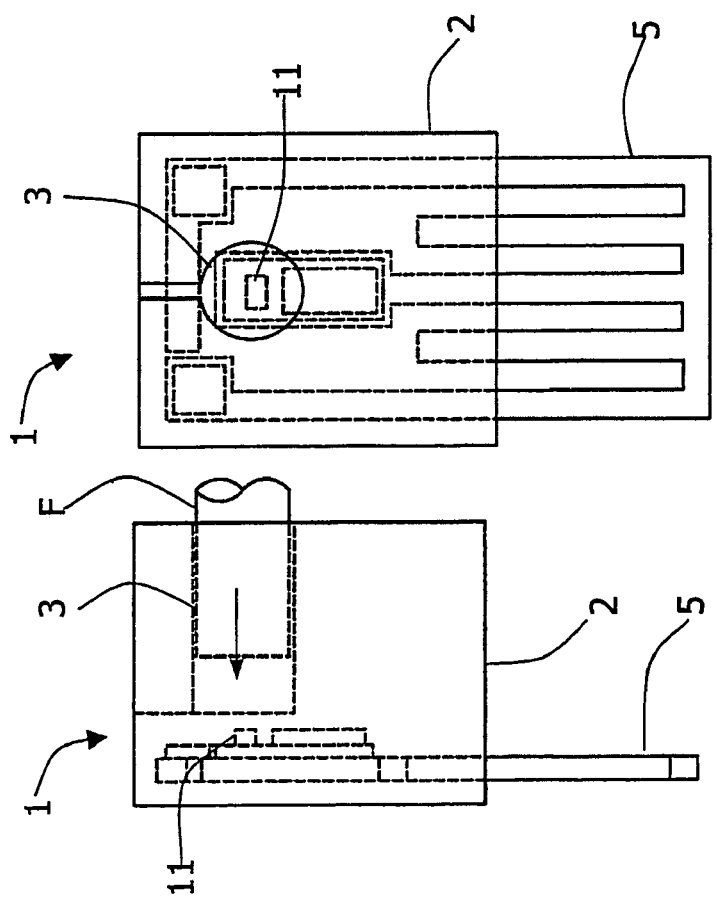
Fig.1
Fig.2
Fig.3
Fig.4

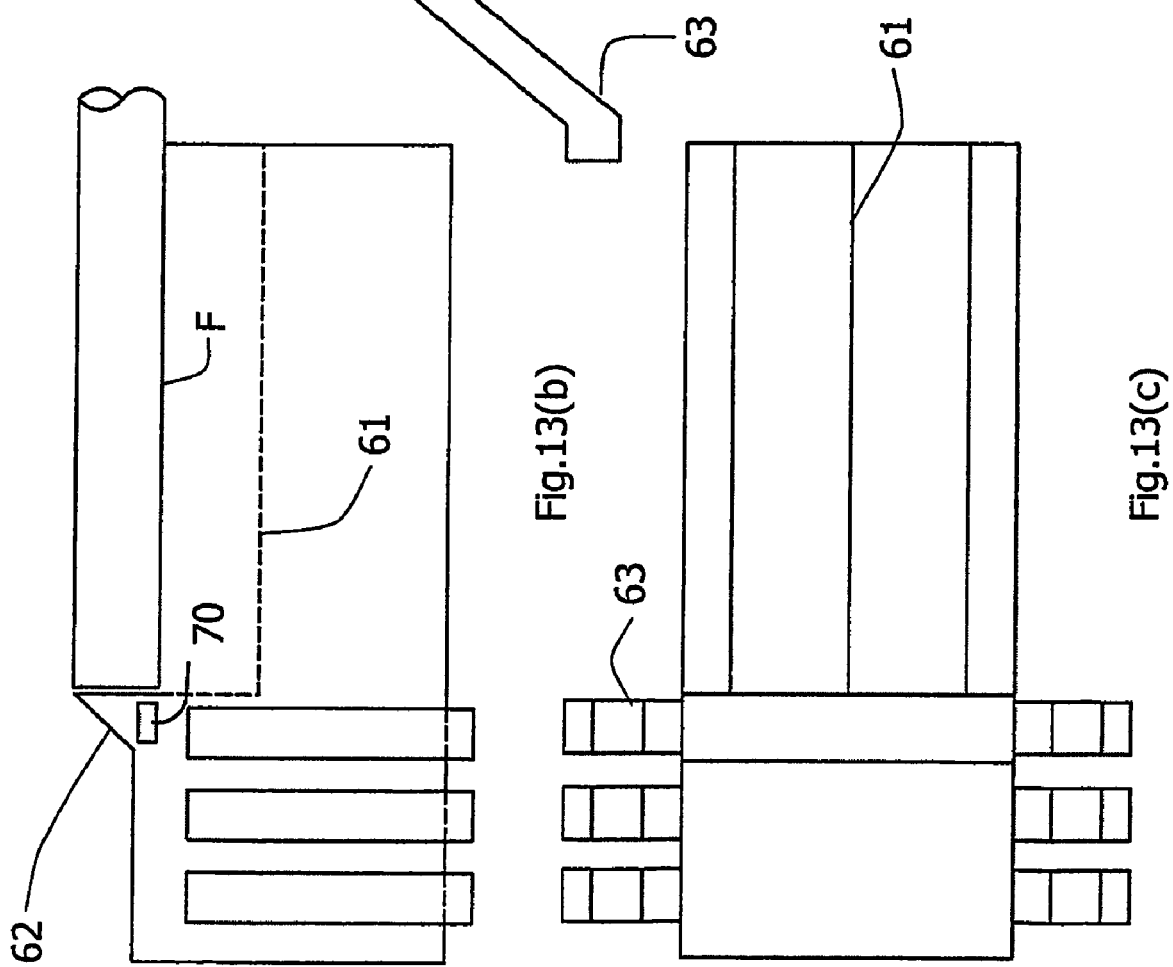

CONNECTION OF OPTICAL WAVEGUIDES TO OPTICAL DEVICES

This is a continuation of PCT/IE03/000144 filed Oct. 21, 2003 and published in English.

INTRODUCTION

1. Field of the Invention

The invention relates to connection of optical devices to terminations of optical waveguides for transmitting and/or receiving data or for coupling to other waveguides.

2. Prior Art Discussion

It is known to provide an optical fibre having a ferrule at its end, and a coupler for guiding the ferrule into a socket for an optical device. Typically, there is a snap-fitting fastener arrangement between the ferrule and the socket, and the socket is tapered internally to guide the fibre termination into registry.

This arrangement allows fibres to be coupled to devices in the field. However, while this is convenient it is often the case that coupling efficiency degrades over time due to contamination at the fibre termination and/or in the socket because they are exposed.

Patent Abstracts of Japan 10282369 describes a coupler having a laser device. Resin is filled over the laser device, an optical fibre, a photodetector, and a silicon substrate. A resin lid is used to cover the resin case. U.S. Pat. No. 6,312,624 describes an arrangement whereby a body is moulded to a substrate, the body having a functional surface for optical coupling. The body also has receiving sleeve for retaining the end of a waveguide by resilience. It appears that such an arrangement could cause deformation of the end of the waveguide.

U.S. Pat. No. 6,170,996 describes an optical module in which a fibre termination is placed on a V-groove and a resin is dispersed over an optical component and the fibre end face. A second resin may then be moulded over the whole module. This arrangement appears to be complex.

The invention addresses this problem.

SUMMARY OF THE INVENTION

According to the invention, there is provided an optical assembly for connection to a fibre termination, the assembly comprising a body comprising a socket to receive a fibre termination, and the body supports an optical device in fixed position in relation to the socket.

In one embodiment, the socket is shaped for a friction fit of a fibre termination.

In another embodiment, the body comprises a vent for excess fibre-bonding epoxy during insertion of a fibre.

In a further embodiment, the vent extends at right angles to the axial direction of the socket.

In one embodiment, the vent is in the shape of an elongate slot extending for at least part of the length of the socket.

In another embodiment, the socket is of circular cross-section having a diameter matching that of a fibre termination for a friction fit, and the cross-sectional shape is uniform along the length of the socket.

In a further embodiment, the optical device is mounted on an electrical lead frame.

In one embodiment, part of the lead frame is encapsulated in the body, and electrical terminals of the lead frame protrude from the body.

In another embodiment, the lead frame extends substantially parallel to an end face of the socket.

In a further embodiment, the lead frame supports an insulation plate, and the optical device is mounted on the insulation plate.

In one embodiment, the lead frame supports at least one decoupling capacitor embedded within the body.

In another embodiment, the lead frame is of generally rectangular overall shape, and there is a decoupling capacitor at two corners of the lead frame.

In a further embodiment, there is a gap of body material between the optical device and a socket end face.

In one embodiment, the socket has a planar end face.

In another embodiment, the assembly further comprises a mirror for direction of light between the optical device and the fibre.

In a further embodiment, the socket is of open V-shaped configuration.

In another aspect, the invention provides an optical fibre product comprising an assembly as defined above and an optical fibre having a termination inserted in the socket and secured in place by a bonding agent.

In one embodiment, said body forms part of an optical path between the fibre and the optical device.

In another embodiment, the method comprises the steps of:
  applying a bonding composition to the fibre termination or to the socket,
  pushing the fibre termination into the socket until an optimum position is reached at which optical coupling between the fibre and the optical device in the assembly is satisfactory, and
  curing the bonding composition while retaining the fibre termination at the optimum position.

In a further embodiment, the optical device is an opto-electronic receiver device, a test optical signal is directed through the fibre, and an electronic signal output of said device is monitored to determine the optimum fibre termination position.

In one embodiment, the optical device is a transmitter, and light output at the far end of the fibre is monitored to determine the optimum fibre termination position.

DETAILED DESCRIPTION OF THE INVENTION

Brief Description of the Drawings

The invention will be more dearly understood from the following description of some embodiments thereof, given by way of example only with reference to the accompanying drawings in which:

FIGS. 1 to 4 are perspective, end, side, and underneath plan views respectively of an optical subassembly for connection to a fibre termination;

FIGS. 13(*a*) to 13(*c*) are views of a further subassembly.

DESCRIPTION OF THE EMBODIMENTS

Figure 5:
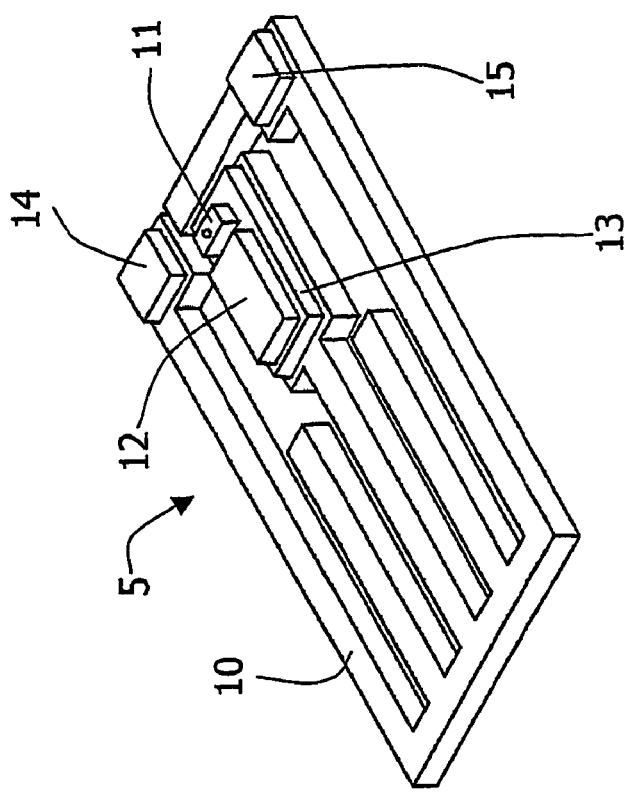
FIGS. 5, 6, 7, and 8 are perspective, front, side, and plan views respectively of a lead frame of the subassembly.
Figure 6:
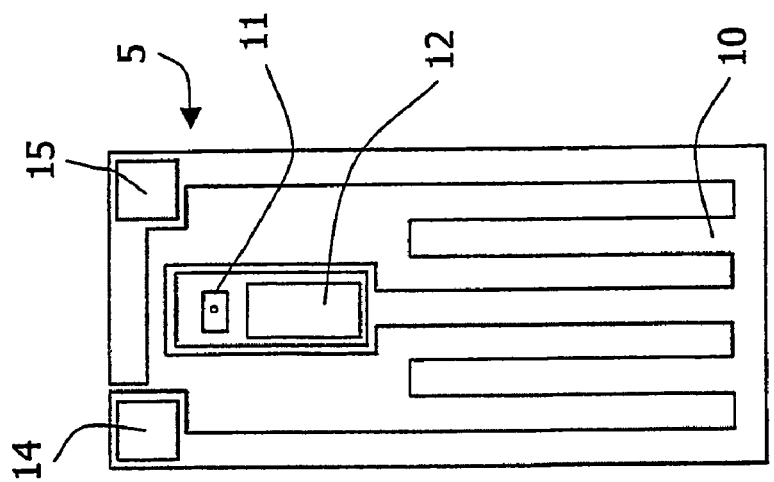
Figure 8:
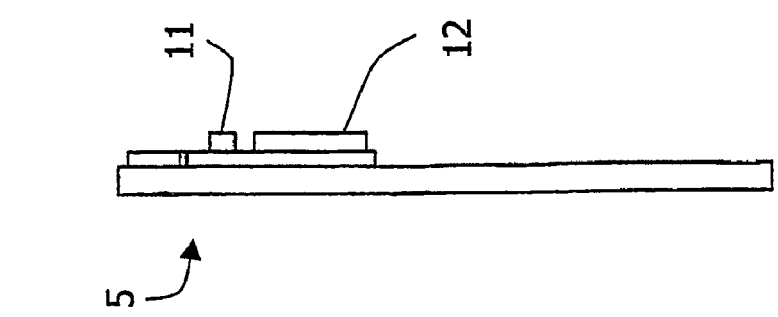
Figure 7:
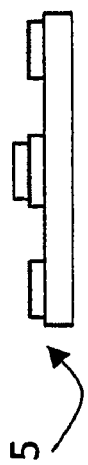

Referring to FIGS. 1 to 8, an optical subassembly 1 is for permanent connection to a fibre termination and for releasable electrical connection to the remainder of a transceiver. The subassembly 1 comprises a moulded plastics body 2 of transparent thermoset epoxy material within which there is a socket 3 of uniform circular cross section, matched in diameter with a fibre termination ferrule to fit into the socket 3. The body 2 has a slot 4 running along the length of the socket 3.

The subassembly 1 also comprises a lead frame 5 encapsulated in the body 2. The lead frame 5 comprises Cu alloy terminals 10 in a rigid structure. This structure supports a PIN photodiode 11 and a trans-impedance amplifier (TIA) 12 mounted on a ceramic insulating plate 13. Capacitors 14 and 15 are mounted in the corners for decoupling.

The lead frame 5 is encapsulated in the (transparent) body 2 so that the PIN diode 11 is in alignment with the central axis of the socket 3. The encapsulation of the lead frame 5 leaves a spacing of the transparent body material between the PIN diode 11 and the end of the socket 3.

Connection of a fibre termination ferrule F to the subassembly 1 is very simple, as shown in FIG. 3. An epoxy is applied to the outer surface of the ferrule F. The ferrule F is gradually pushed, either manually or by robot, into the socket 3. The fit is a tight, friction fit leaving little or no space for radial variation. The epoxy 21 forms a thin film surrounding at least some of the outer surface of the ferrule F.

Figure 9:
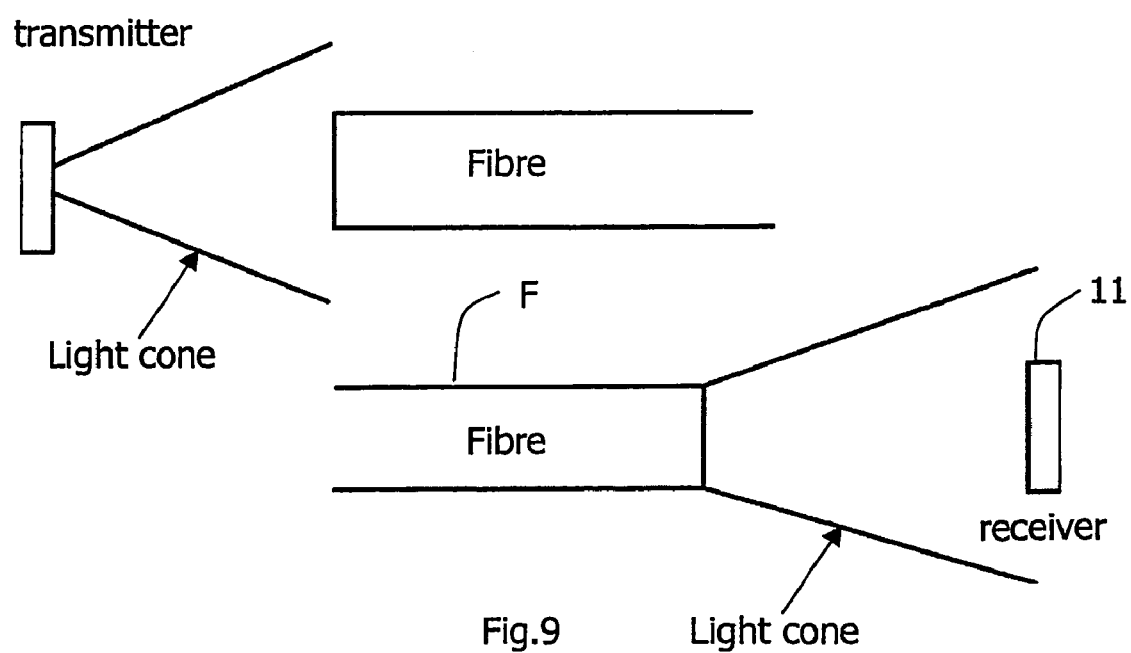
FIG. 9 is a diagram illustrating optical coupling.

As the ferrule F is inserted into the socket 3 a test light signal is directed through the fibre towards this termination. The corresponding electronic TIA output is monitored continually as the ferrule is inserted. The amplitude of the TIA output reaches a peak for a certain insertion distance of the fibre because of the relationship between the positions of the PIN diode 11 and the ferrule end. As shown in FIG. 9 there is a "field of view" cone of emitted light extending through the body 2 and encompassing the PIN diode 11. Likewise, if the optical device were a transmitter the same principle applies in reverse as shown in this diagram.

Figure 10:
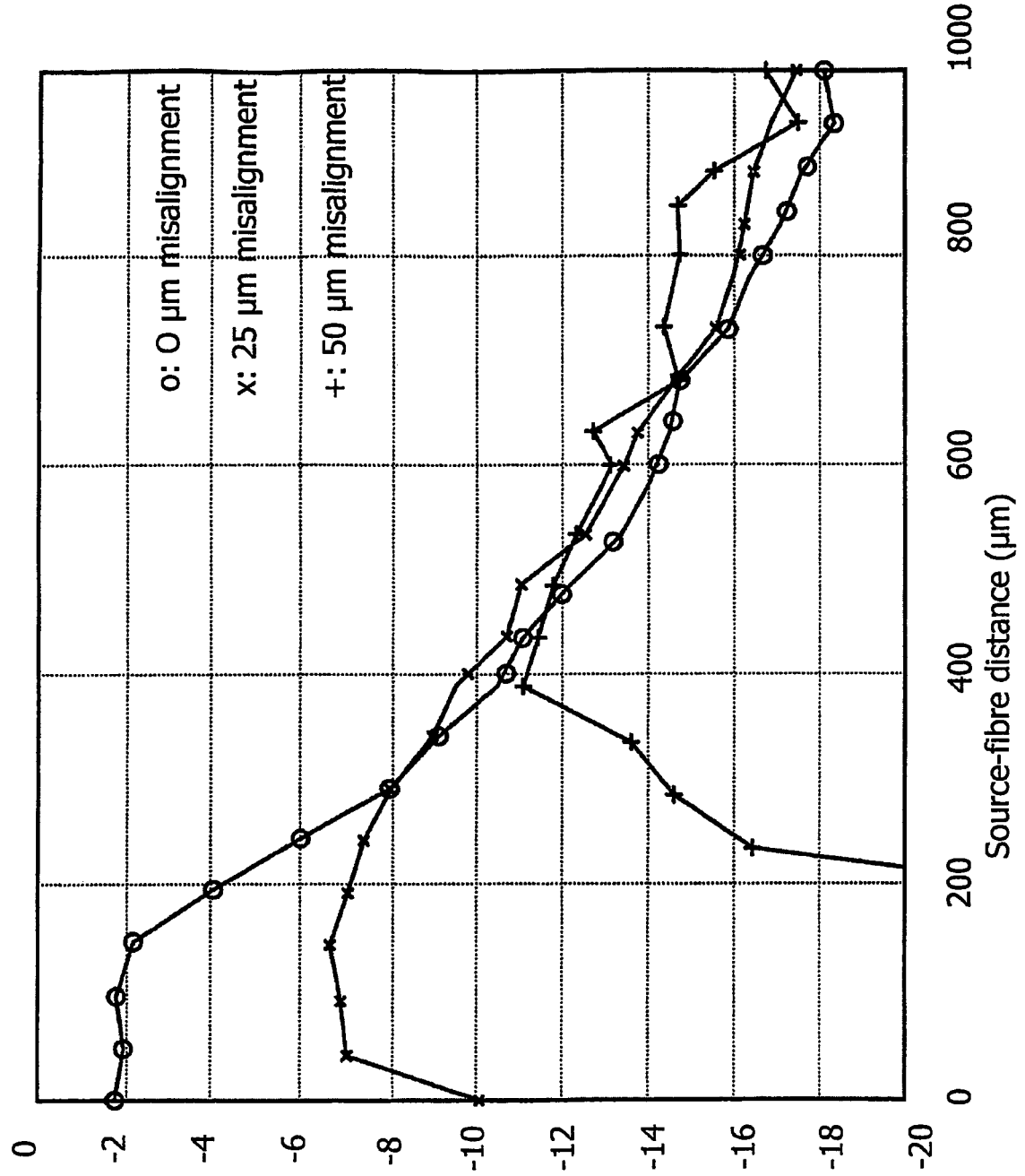
FIG. 10 is a set of plots illustrating coupling efficiency as a function of the distance between the end of the fibre and the optical device.
Figure 12A:
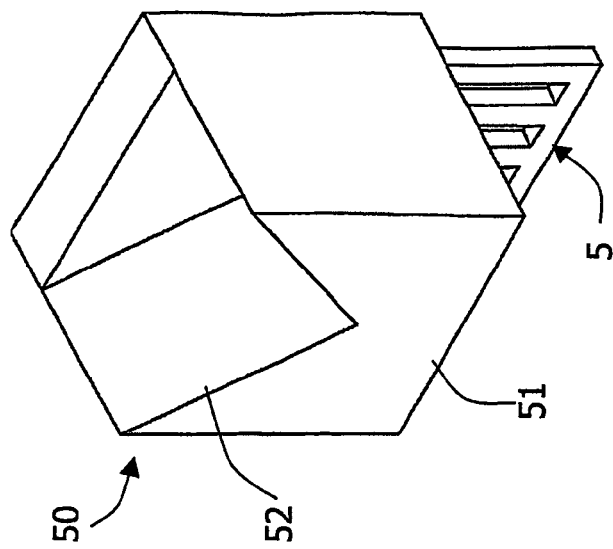
FIGS. 12(*a*) to 12(*d*) are views of an alternative subassembly.
Figure 12B:
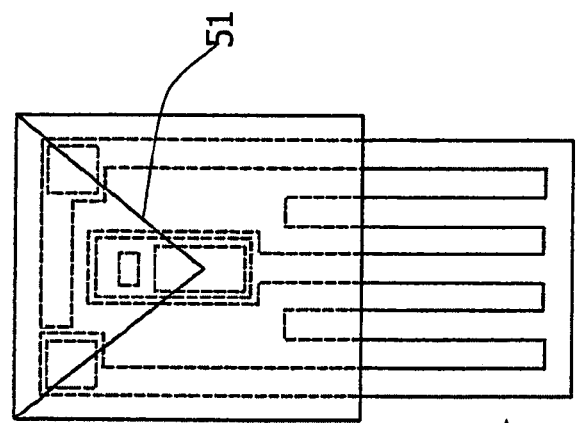
Figure 12C:
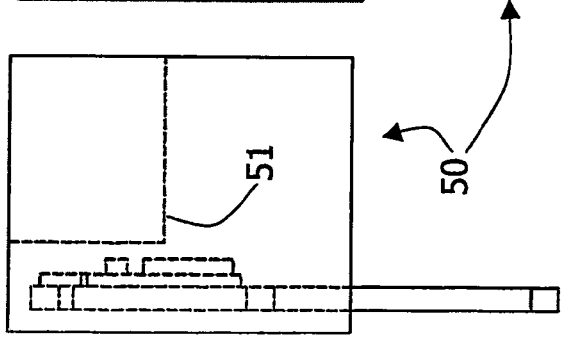
Figure 12D:
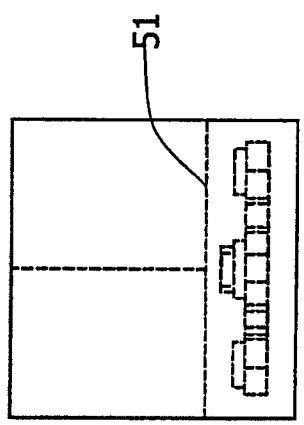

It will be appreciated that the PIN diode 11 may be misaligned from the central axis of the fibre by some microns. However, it will still be in the cone and is in a maximum of light intensity for a certain distance between the end of the ferrule F and the end of the socket 3. FIG. 10 shows plots of coupling efficiency versus fibre insertion distance for three values of relative misalignment from the centre of the fibre. Thus, for any one misalignment value there is a particular optimum insertion distance of the ferrule. This can be determined by simply monitoring the TIA output as the ferrule is pushed in. This can be done by measuring the DC bias voltage on the monitor pin of a post limiting amplifier (PLA) which is in the transceiver circuit outside of the assembly 1.

When the optimum position is reached the epoxy is cured by application of UV, effectively "freezing" the ferrule in position.

FIG. 9 shows an equivalent "field of view" cone for an embodiment in which the subassembly comprises a transmitter. In this embodiment, as the fibre is pushed the light output at the far end is monitored to determine the optimum position.

The optimum gap between the fibre end and the optical device is a unique parameter for each optical device. In the case of the transmitting device it depends on the positioning of the device and the divergence angle of the optical beam. In the case of the receiving device it depends on the positioning of the device and the numerical aperture of the fibre.

The end of the lead frame distant from the body 2 has a lateral end piece. The purpose of this is to hold the lead frame together during manufacture. This is cut off at an appropriate stage in the production process to leave separate terminal pins.

Figure 11:
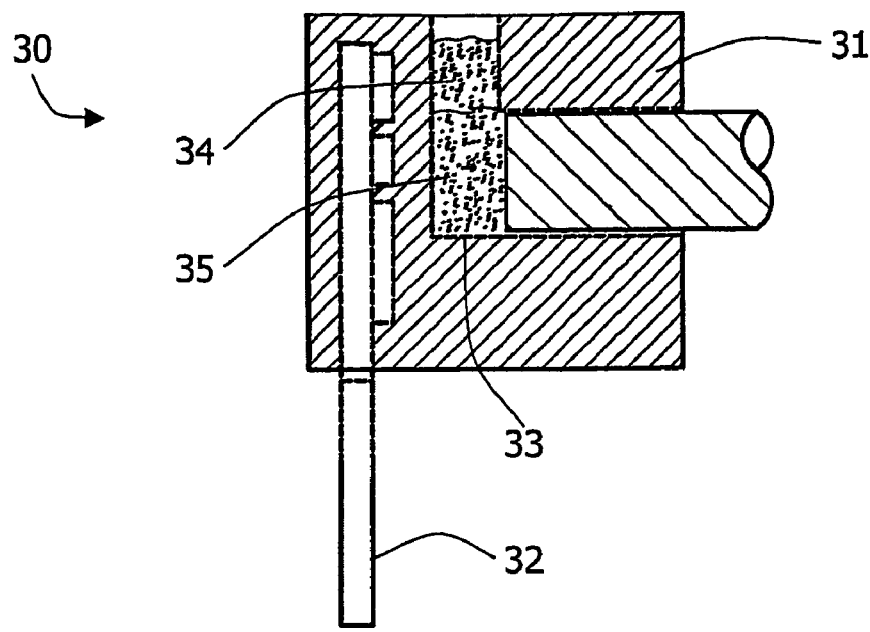
FIG. 11 is a diagrammatic side view of an alternative subassembly.

Alternative embodiments within the scope of the invention will be apparent to those skilled in the art. Referring to FIG. 11, in another embodiment a subassembly 30 has a body 31 and a lead frame 32. A socket 33 is linked with a vent duct 34 for excess epoxy 35. Epoxy 35 is inserted into the socket 33. As the ferrule F is inserted, some of the epoxy 35 is pushed into the gap separating the end of the ferrule F from the end of the socket 33 and some is in thin film around the ferrule. Excess epoxy is allowed escape into the vent duct 34. Thus, there is a quantity of epoxy in the gap at the end of the ferrule F. The epoxy is index matched to the glass (or plastic) core of the fibre so that losses are minimised in the subassembly. The duct 34 allows the ferrule F to be pushed in to any desired depth.

Referring to FIGS. 12(a) to 12(d) inclusive an optical assembly 50 comprises a V-shaped socket 52 in a body 51. The socket 52 can align the fibre in an X-Y plane vertically through the socket to allow Z adjustment as the fibre is inserted. In this arrangement the fibre ferrule may be easily placed as it may be inserted from above or axially as desired. In this, as in previous embodiments, the epoxy may be applied either to the ferrule or to the socket.

Referring to FIGS. 13(a) to 13(c) an optical assembly 60 has a V-shaped socket 61 and a reflector 62 arranged to re-direct light from a transmitter 70 into a ferrule F placed in the socket 61. In this embodiment the lead frame comprises splayed-out terminals 63. Advantages of this arrangement are that it minimises the height of the overall package. All electronic/optical components are in a plane parallel to the fibre, thus minimising the depth of the overall assembly.

A complete communication link having a transmitter, a fibre, and a receiver may be completed with optimum coupling at both ends of the fibre. For example, the fibre may be inserted in the transmit end first without monitoring. The receive end of the fibre is then inserted with monitoring to set the optimum position, the position being "frozen" by UV curing. The fibre at the transmit end is then adjusted to "fine tune" the link and provide an attenuation budget which is greater than a given minimum.

It will be appreciated that there are significant advantages to the invention. The end user is provided with an integral fibre and fixed optical coupling at its termination. To complete a connector it is only necessary to simply push fit the lead frame 5 into a corresponding electrical socket in the other part of the connector. This also allows modularity. No optical interconnection or coupling is required by the end user and so risk of contamination is reduced. Another advantage is that the manufacturer has the benefit of being able to monitor and guarantee the coupling efficiency of the connection. The epoxy has the same optical properties before and after curing so that the performance monitored at the TIA output in consistently achieved during the product lifetime. The method of inserting and bonding the fibre termination compensates for slight mis-alignments of the opto-electronic device 5 and an off-perpendicular end face of the fibre.

The invention is not limited to the embodiments described but may be varied in construction and detail. For example, the socket may have two or more sections, one suited to a larger diameter than another, so that one can support the bare fibre, or the fibre in a ferrule, while the other supports the fibre inside a jacket which runs for most of the length of the fibre, or a sleeve placed over part of the ferrule.

Also, where a mirror is used for coupling light to or from the fibre, the mirror may be curved (e.g. parabolic) for effective focusing. Also, the socket may have sufficient length and diameter so that is supports both a ferrule and a jacketing of the fibre. In this example, the socket may be stepped to accommodate the different diameters. Furthermore, the electrical pins may be suitable for soldering or fixing by conductive epoxy or similar means. Also, the body may be of any suitable transparent material such as thermoplastic resins, thermoset epoxies, and two-part epoxies. Also, the optical device may be protected against ingress of contaminants from the body during moulding. Such protection may comprise silicon oxide, atmosphere pressure oxide, silica gel, or other material.

The invention claimed is:

1. An optical assembly for connection to a fiber termination, the optical assembly comprising:
   a body,
   a blind socket in the body to receive a fiber termination, said blind socket having an end face, and
   an optical device supported by the body in a fixed position in relation to the socket,
   the body including a vent for excess fiber-bonding epoxy during insertion of a fiber into the blind socket, said vent extending from the end face of the blind socket for at least some of a length of the blind socket to form a reservoir for holding the excess epoxy.

2. The optical assembly as claimed in claim 1, wherein the socket is shaped for a friction fit of a fiber termination.

3. The optical assembly as claimed in claim 1, wherein the vent extends at right angles to an axial direction of the blind socket.

4. The optical assembly as claimed in claim 1, wherein the vent is in a shape of an elongate slot extending for at least part of the length of the blind socket.

5. The optical assembly as claimed in claim 1, wherein the socket is of circular cross-section having a diameter matching that of a fiber termination for a friction fit, and the cross-sectional shape is uniform along the length of the blind socket.

6. The optical assembly as claimed in claim 1, wherein the optical device is mounted on an electrical lead frame.

7. The optical assembly as claimed in claim 1, wherein the optical device is mounted on an electrical lead frame, and part of the lead frame is encapsulated in the body, and electrical terminals of the lead frame protrude from the body.

8. The optical assembly as claimed in claim 1, wherein the optical device is mounted on an electrical lead frame, and part of the lead frame is encapsulated in the body, and electrical terminals of the lead frame protrude from the body, and the lead frame extends substantially parallel to the end face of the blind socket.

9. The optical assembly as claimed in claim 1, wherein the optical device is mounted on an electrical lead frame, and the lead frame supports an insulation plate, and the optical device is mounted on the insulation plate.

10. The optical assembly as claimed in claim 1, wherein the optical device is mounted on an electrical lead frame, and the lead frame supports at least one decoupling capacitor embedded within the body.

11. The optical assembly as claimed in claim 1, wherein the optical device is mounted on an electrical lead frame, and the lead frame is of generally rectangular overall shape, and there is a decoupling capacitor at two corners of the lead frame.

12. The optical assembly as claimed in claim 1, wherein there is a gap of body material between the optical device and the socket end face.

13. The optical assembly as claimed in claim 1, wherein the socket end face is planar.

14. The optical assembly as claimed in claim 1, comprising a mirror for direction of light between the optical device and the fiber.

15. An optical fiber product comprising the assembly as claimed in claim 1 and an optical fiber having a termination inserted in the blind socket and secured in place by a bonding agent.

16. The optical fiber product as claimed in claim 15, wherein said body forms part of an optical path between the fiber and the optical device.

17. A method of connecting a fiber termination to the optical assembly as claimed in claim 1, comprising the steps of:
    applying a bonding composition to one of the fiber termination and the blind socket,
    pushing the fiber termination into the blind socket until an optimum position is reached at which optical coupling between the fiber and the optical device in the assembly is satisfactory, and
    curing the bonding composition while retaining the fiber termination at an optimum position.

18. The method as claimed in claim 17, wherein the optical device is an opto-electronic receiver device, a test optical signal is directed through the fiber, and an electronic signal output of said device is monitored to determine the optimum fiber termination position.

19. The method as claimed in claim 17, wherein the optical device is a transmitter, and light output at a far end of the fiber is monitored to determine the optimum fiber termination position.

* * * * *